(12) United States Patent
Garney (10) Patent No.: US 7,174,285 B1
(45) Date of Patent: Feb. 6, 2007

(54) METHOD AND APPARATUS FOR ASSESSING QUALITY OF SERVICE FOR COMMUNICATION NETWORKS

(75) Inventor: David John Garney, Glen Ellyn, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/536,502

(22) Filed: Mar. 27, 2000

(51) Int. Cl.
G06F 13/10 (2006.01)
G06F 13/12 (2006.01)

(52) U.S. Cl. .......................... 703/21; 701/13; 701/20; 701/24; 370/228; 370/230; 370/241; 370/252

(58) Field of Classification Search ............... 703/14, 703/13, 27; 709/241, 231; 370/241–253
See application file for complete search history.

(56) References Cited

U.S. PATENT DOCUMENTS

| | | | |
|---|---|---|---|
| 5,499,238 A * | 3/1996 | Shon | 370/399 |
| 5,812,526 A * | 9/1998 | Chang et al. | 370/230 |
| 5,838,948 A * | 11/1998 | Bunza | 703/27 |
| 5,907,696 A * | 5/1999 | Stilwell et al. | 703/13 |
| 6,055,571 A * | 4/2000 | Fulp et al. | 709/224 |
| 6,078,594 A * | 6/2000 | Anderson et al. | 370/498 |
| 6,108,309 A * | 8/2000 | Cohoe et al. | 370/241 |
| 6,128,305 A * | 10/2000 | Hjalmtysson et al. | 370/410 |
| 6,185,210 B1 * | 2/2001 | Troxel | 370/395.32 |
| 6,335,927 B1 * | 1/2002 | Elliott et al. | 370/352 |
| 6,363,429 B1 * | 3/2002 | Ketcham | 709/235 |
| 6,404,738 B1 * | 6/2002 | Reininger et al. | 370/236 |
| 6,421,350 B1 * | 7/2002 | Szurkowski et al. | 370/419 |
| 6,442,141 B1 * | 8/2002 | Borella et al. | 370/248 |
| 6,442,615 B1 * | 8/2002 | Nordenstam et al. | 709/241 |
| 6,466,548 B1 * | 10/2002 | Fitzgerald | 370/249 |
| 6,487,196 B1 * | 11/2002 | Verthein et al. | 370/352 |
| 6,556,565 B1 * | 4/2003 | Ward et al. | 370/356 |
| 6,771,594 B1 * | 8/2004 | Upadrasta | 370/228 |
| 2002/0007416 A1 * | 1/2002 | Putzolu | 709/231 |

FOREIGN PATENT DOCUMENTS

GB       2355901 A  *  2/2001

OTHER PUBLICATIONS

"Network Simulations with OPNET", X. Chang, Proceedings of 1999 Winter Simulation Conference, IEEE 1999.*
"Injection simulation and Modeling Upstream in the System Engineering Process", S. Yarden, Proceeding 1996 Winter Simulation Conference, ACM 1996.*
"OPNET Modeler", Product Specification, MIL3 Technologies, 1999.*
"CalkWak Pro Audio 9 Software", Pro Audio Review, Jan. 2000.*
"Predicting and Measuring Quality of Service for Mobile Multimedia", M.B. Myers, 3G Mobile Communications Technologies, Conference Publication No. 471, Mar. 27, 2000.*
"Robust Perceptual Assessment of end-to-end Audio Quality", Rix et al, IEEE Workshop on Applicantions of Signal Processing, 1999 IEEE.*

(Continued)

Primary Examiner—Fred Ferris (57) ABSTRACT

This invention relates to a method and apparatus for assessing quality of service for communication networks. More particularly, the invention is directed to assessing quality of service in circuit and packet switched networks by way of a computer simulation. Preferably, the information necessary to conduct the assessment activity is available via the internet from a web server that also compiles statistical data on the resultant quality of service assessments.

18 Claims, 7 Drawing Sheets

OTHER PUBLICATIONS

"Quality of Service: Measurement Method Selection", EURESCOM Project P603, vol. 1: Main Report, Oct. 1997.*

"Telecommunications and Internet Protocol Harmonization Over Networks (TIPHON); General aspects of Quality of Service (QoS)," Technical Report of DTR TIPHON-05001—V1.2.5, pp. 1-32 (1998).

"End-to end quality—Recommendations for planning agreements—version 1.0a," ed. Thomas Achenbach, AKNN, pp. 1-20 (Feb. 5, 1999).

Cool Edit Pro Demo, 6 pages (Jul. 6, 1999).

"Convergance Solutions: PathStar™ Access Server," website page from http://www.lucent-ssg.com (1 page, 2-sided) (printed Jan. 17, 2001).

7R/E™ NOW—The Fast Track to a Packet Network (3 pages).

"Lucent Echo Solutions: T1 Echo Cancellers," website pages from http://lucent-ssg.com (1 page, 2-sided) (printed Jan. 16, 2001).

"T1 Echo Cancellers—Improved Voice Quality for Your T1 International Gateway, Long-Distance, and Digital Wireless Markets," Lucent Technologies—Bell Labs Innovations, 4 pages (1999).

"High Density Echo Canceller and Voice Enhancement System The Clear Connection," Lucent Technologies—Bell Labs Innovations, 4 pages (1999).

"Cool Edit Pro—Version 1.1 User Guide," Syntrillium Software Corporation, pp. 1-225 (1998).

Tom Connell, *Waveform Editing and MultiTrack Audio Recording for Windows—CoolEdit Pro 1.01*, website pages from http://www.webdevelopersjournal.com/studio/cool edit.html, 2 pages, (dated May 24, 1999) (printed Sep. 17, 2004).

Tom Connell, *Full-Featured Audio Editing Package—Sound Forge 4.5*, website pages from http://www.webdevelopersjournal.com/studio/souond Forge.html, 3 pages, (dated Feb. 25, 1999 (printed Sep. 17, 2004).

*Cakewalk Power—Table of Contents*, website pages from http://cakewalk.com/Products/Books/CWPowerIndex.asp, 2 pages, (printed Sep. 17, 2004).

*Understanding CAL*, website page from http://svpworld.com/cakewalk cal/understanding cal.asp, 1 page, (dated Sep. 17, 2004).

* cited by examiner

| NETWORK IDENTITY (202) | QUALITY OF SERVICE DATA VALUES COLLECTED, END TO END SPEECH PERFORMANCE, E-MODEL DATA AS SPECIFIED BY ETSI STANDARDS AND ITU-T RECOMMENDATIONS., etc. (204) |
|---|---|
| A | USER HISTORICAL EVENT INFORMATION, ... |
|   | LANGUAGE TYPE A RESULTS, PARAMETERS, ... |
|   | LANGUAGE TYPE B RESULTS, PARAMETERS |
|   | etc. |
| B |   |
| C |   |
|   |   |
| H |   |
| I | USER HISTORICAL EVENT INFORMATION, |
|   | etc. |
|   |   |

- PROVIDE CONFIGURATION INFORMATION — 602
- PROVIDE COMPONENT INFORMATION — 604
- PROVIDE PATH LATENCY INFORMATION — 606
- PROVIDE AUDIO TOOLS — 608
- COMPILE QUALITY OF SERVICE DATA — 610
- STORE QUALITY OF SERVICE DATA — 612

METHOD AND APPARATUS FOR ASSESSING QUALITY OF SERVICE FOR COMMUNICATION NETWORKS

BACKGROUND OF THE INVENTION

This invention relates to a method and apparatus for assessing quality of service for communication networks. More particularly, the invention is directed to assessing quality of service in circuit and packet switched networks by way of a computer simulation. Preferably, the information necessary to conduct the assessment activity is available via the internet from a web server that also compiles statistical data on the resultant quality of service assessments.

While the invention is particularly directed to the art of assessing quality of service for communication networks, and will be thus described with specific reference thereto, it will be appreciated that the invention may have usefulness in other fields and applications. For example, the invention may be used in any system where quality of service issues arise such as on local area networks and the like.

By way of background, phone companies historically performed expensive tests to determine network interface rules for the North American market. This included subjective statistical Quality of Service tests to determine subscriber tolerances relating to communications signal levels, distances, echo, phone sets, etc. From this data, interface rules were established concerning ranges for acceptable db loss and related latency delays and the distances between network components.

Figure 1:
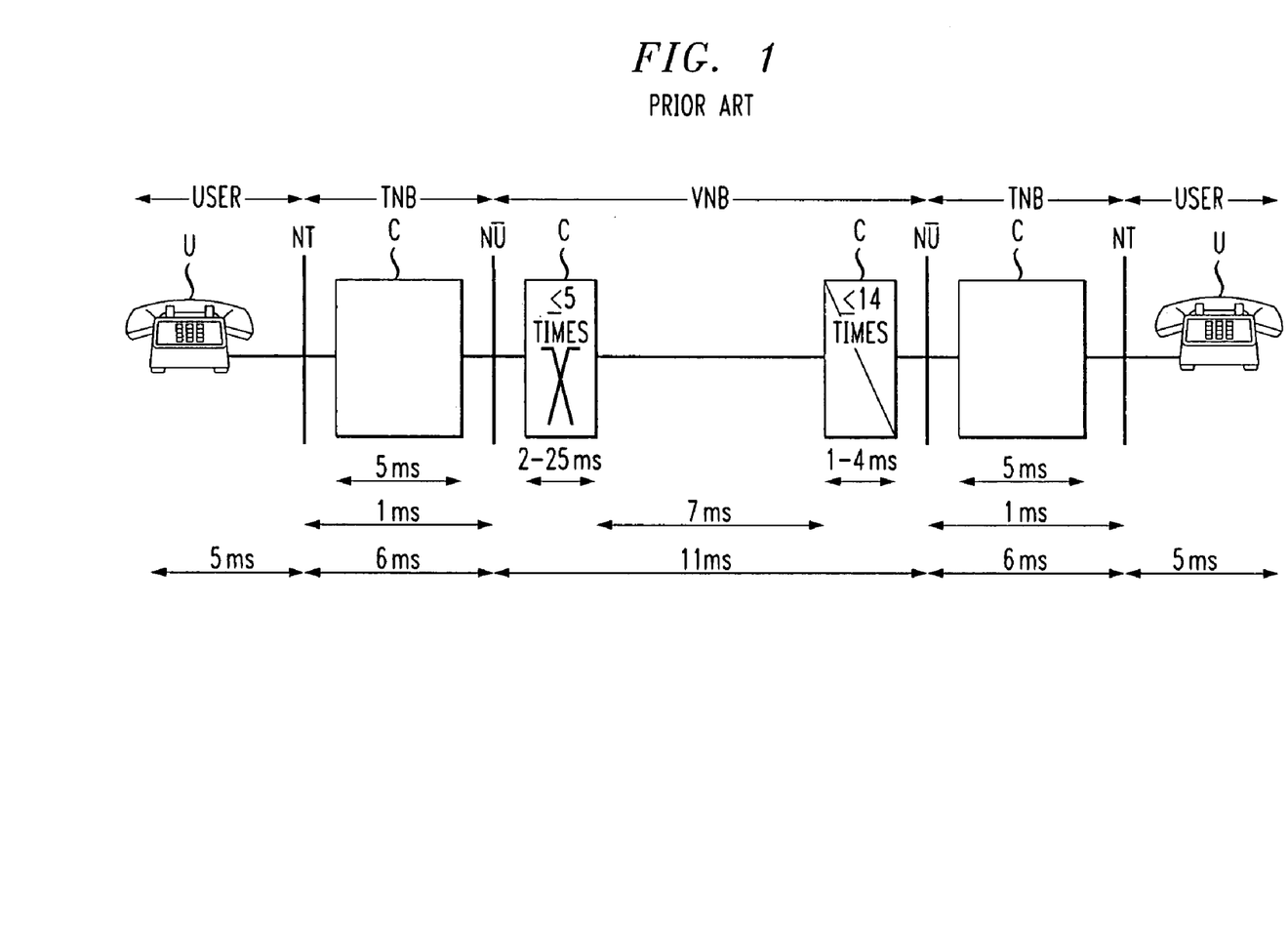
FIG. 1 is a schematic illustration of a typical network to illustrate latency time delays therein.
Figure 2:
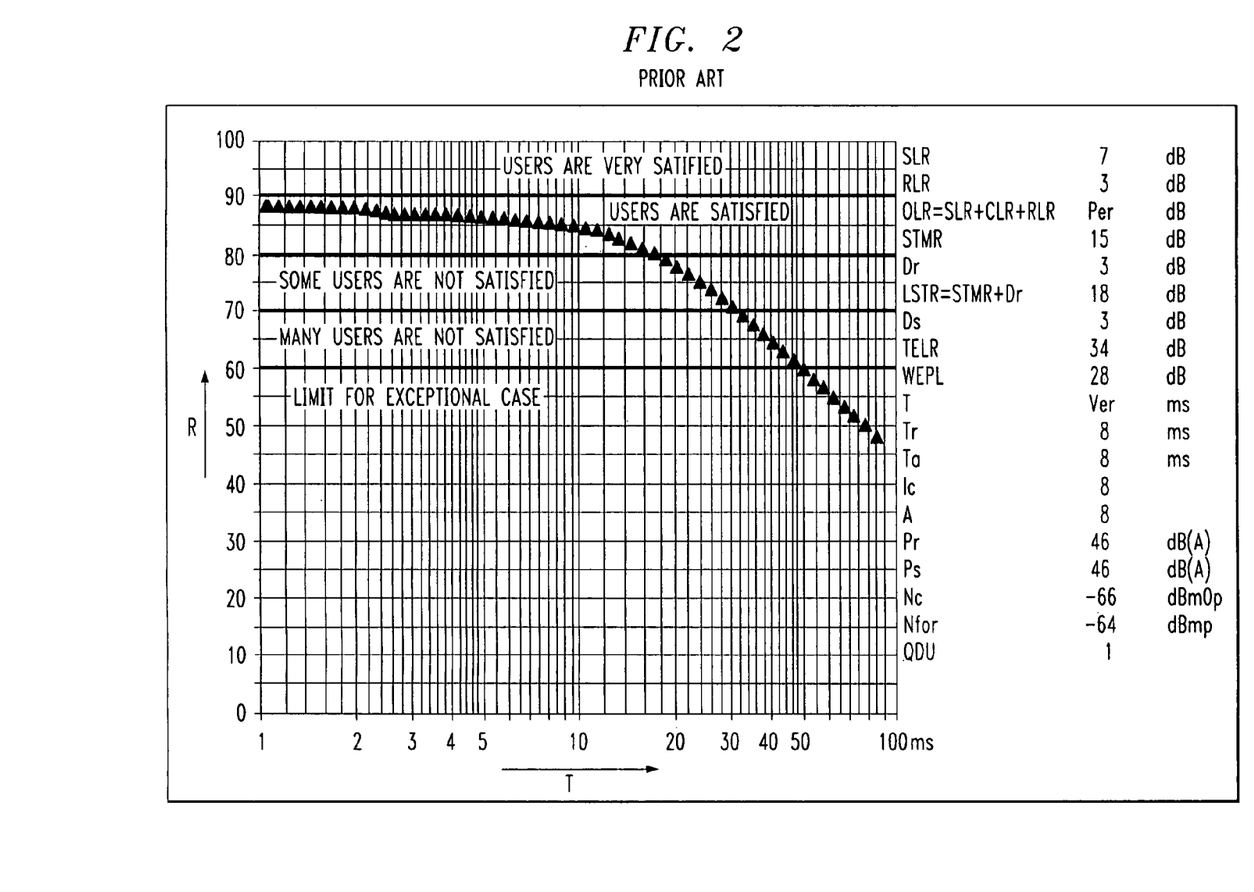
FIG. 2 is a graph showing user satisfaction relative to latency time delay.

More particularly, prior manners of network planning and design can be better understood by referring to FIGS. 1 and 2. In FIG. 1, it is shown that individual components C in a path between users U contribute to latency time delays as illustrated throughout the network path. The total time delay between the users, as shown, is 33 ms. These time delays are directly related to echoes that can be heard by the users and, of course, impact the Quality of Service to the users. Such impact is illustrated in FIG. 2 wherein a rating factor (measuring voice transmission and quality) is plotted versus the time delay. It can be seen that as the time delay increases, user satisfaction decreases.

It is to be appreciated that well known network devices may be implemented that decrease these latency time delays. However, to test networks during the design process to determine the necessity and/or sufficiency of such devices, there was heretofore available only the above-mentioned, costly physical network tests.

Moreover, with the restructuring of the telecommunications industry, Quality of Service planning and evaluation has become an increasingly complex arena. For example, new packet technology, such as IP/TCP-ATM, changes the shipment and arrival time interval of spoken words and compression and decompression chips remove quiet-time, degrade the signal and add latency delay. This all supports the need for improved Quality of Service techniques that are economical, will allow for customer use on a convenient network such as the World Wide Web (WWW), and will enhance product understanding and sales.

The present invention contemplates a method and apparatus for assessing quality of service for communication networks that resolve the above-referenced difficulties and others.

SUMMARY OF THE INVENTION

A method and apparatus for assessing Quality of Service for communication networks are provided. The method is accomplished and the apparatus is implemented in manners that constitute substantial improvements over the prior known techniques.

In one aspect of the invention, the method comprises providing first information on a configuration of a simulated communication network to a user, providing second information on components of the simulated communication network to the user, providing third information on path latency of the simulated communication network based on the components to the user, providing audio tools to the user to simulate operation of the network based on the first, second and third information, and compiling quality of service data on the simulated communication network that is provided by the user based on the assessment of the quality of service of the operation of the simulated communication network using the audio tools.

In another aspect of the invention, means are provided to accomplish the steps of the above method.

In still another aspect of the invention, the apparatus or system comprises a storage device having stored therein simulated communication network data and audio tools, a quality of service database operable to have compiled therein quality of service data from a plurality of users, a server operable to provide the simulated communication network data and audio tools to a user—the server further being operable to compile the quality of service data from the plurality of users and store the compiled data in the database, and an interface operable to facilitate communication between the server and the plurality of users.

A primary advantage of the invention is that network operation can be simulated for purposes of assessing the Quality of Service of the network. This simulation avoids costly, physical network testing.

Another primary advantage of the invention is that data is compiled relative to specific consumer tolerance of Quality of Service levels for specific simulated networks. This allows for improved Quality of Service assessment over a broader range of customers and networks.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the aspects, objects and/or advantages contemplated are attained as hereinafter more fully set forth, specifically pointed out in the claims, and illustrated in the accompanying drawings in which:

FIG. 7 is a flowchart further illustrating a method according to the present invention; and, FIG. 8 is an illustration of a user interface simulating latency time delay in a network to assess Quality of Service therein.

DETAILED DESCRIPTION OF THE PREFERRED EMBODIMENTS

In accord with the present invention, the effects of latency time delays and signal degradation due to compression/decompression algorithms can be simulated and examined over the network as a whole or across selected network component(s). The primary advantages of this are twofold. First, the method of the present invention avoids the expense of constructing physical networks for Quality of Service evaluations. Second, adjustments to network parameters can be adjusted repeatedly and rapidly for Quality of Service evaluations. For reliability purposes, the simulated portions of the network are tightly controlled by published international standards.

It should be noted that telephony network simulation applications are known to be used for purposes of assessing Quality of Service. Current schemes that are known use well known software packages for measurement of the physical network. As noted above, this is a costly and time consuming method.

Figure 3:
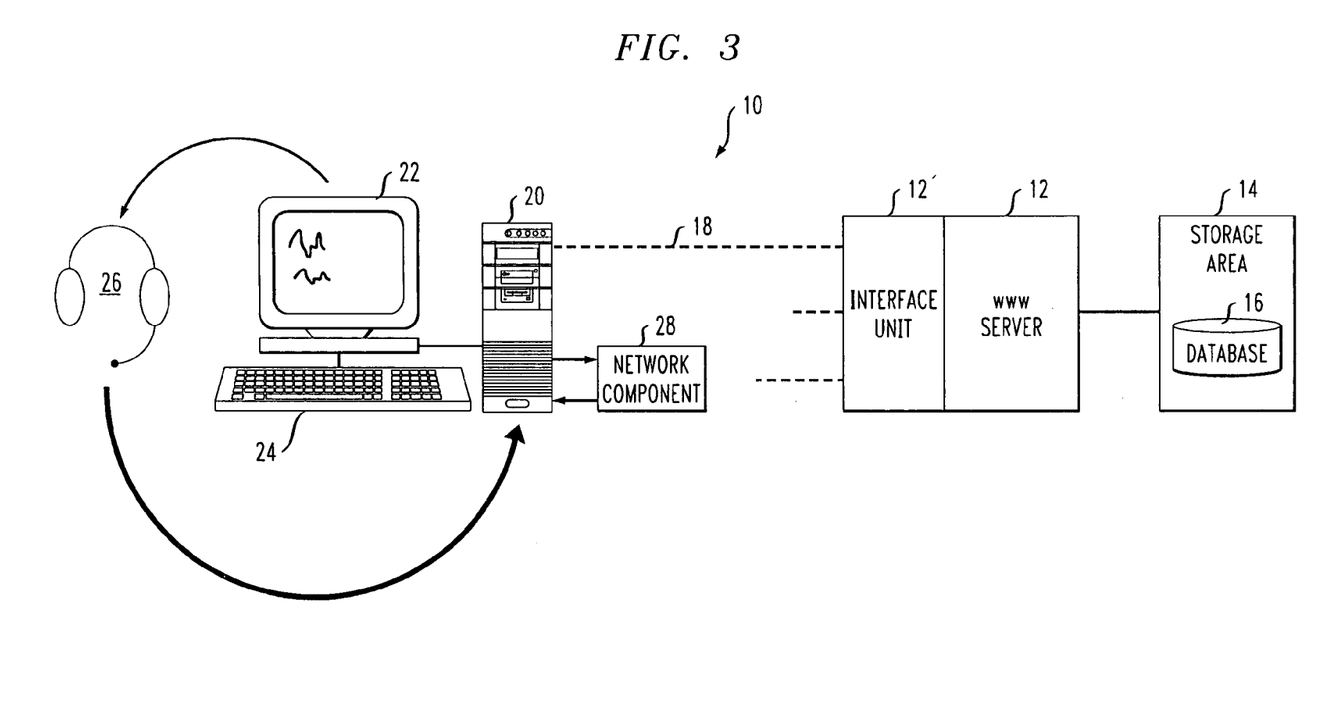
FIG. 3 is a schematic diagram illustrating the overall preferred embodiment of the present invention.

Referring now to the drawings wherein the showings are for purposes of illustrating the preferred embodiments of the invention only and not for purposes of limiting same, FIG. 3 provides a view of the overall preferred system according to the present invention. As shown, the system 10 includes a server 12 operatively connected to a storage area 14 having a database 16 incorporated therein. Of course, it is to be appreciated that the server may take a variety of well-known forms, including an alternate form whereby the storage area 14 is included within the server. The server 12 communicates via a network 18 (preferably the internet or world wide web) with a personal computer, or processing system, 20 having a monitor 22, keyboard 24, and audio/speech equipment 26.

Preferably, the server 12 is a worldwide web server and facilitates the use and provisioning of audio tools such as text-to-speech tools or music/voice analysis tools so that a plurality of users may access these tools. This is accomplished through an interface unit 12' that is incorporated in the server 12. In this regard, data scripts that comply to standards for network components and, optionally, a text source for a voice pattern may also be available for use with these tools. Specifically, a variety of voice language patterns may be available, such as English, Mandarin, Spanish, European French, New Orleans French and Quebec French. Also available to the server for provisioning is information related to a variety of simulated communication networks including data on configurations, components and path latency. This information can include the range and distribution of packet delays, packet size information, compression/decompression parameters and other network definition data. Preferably, the information and tools are stored in storage area 14 and, as noted above, are maintained in strict compliance with published international standards to ensure reliability.

Figure 4:
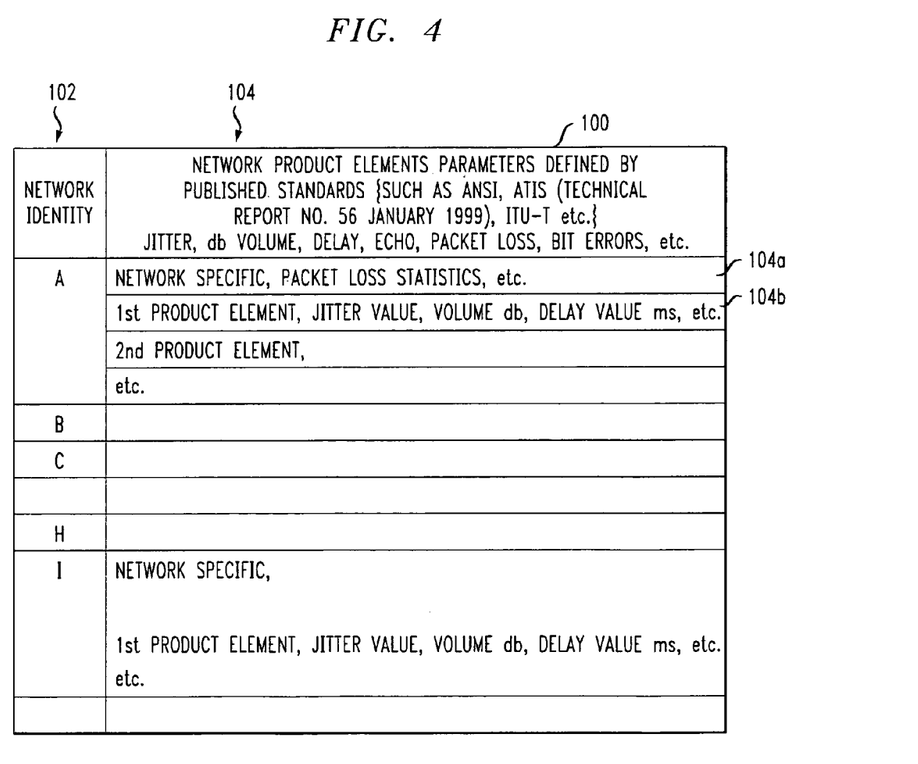
FIG. 4 is an illustration of a table according to the present invention.

More particularly, with reference to FIG. 4, a table 100 that is preferably located in storage area 14 includes two primary types of information. The first is network identity information 102 that identifies various networks that can be tested by users using the present invention. The identified networks may be networks of the owner of the database and server and/or networks of competitors thereof. For example, networks A, B and C may be owned by a particular network provider while networks H and I may be owned by a competitor. Ultimately, data will be gathered on the various networks for comparison purposes via database 16. It should be appreciated that this information can then be used for competitive advantages in the marketplace.

The second type of information stored in table 100 is information relating to the network product element parameters defined by published standards (such as ANSI, ATIS (Technical Report No. 56, January 1999), ITU-T, . . . etc.). The type of information stored in this category is data on jitter, db volume, delay, echo, packet loss, bit errors, . . . etc. As illustrated in FIG. 4, the information 104 is preferably provided for the network as a whole, as shown in line 104a, and for each element of the network, as shown in line 104b and thereafter. As will be appreciated, this information is ultimately utilized by the system to facilitate the network simulation that is used to gather quality of service data in accordance with the invention.

Figure 5:
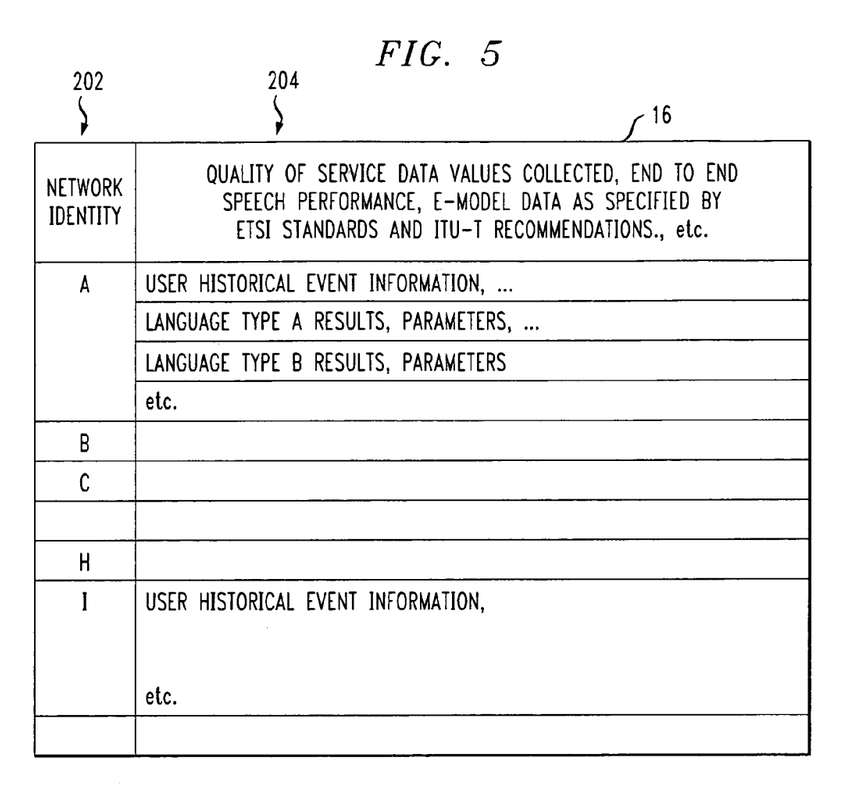
FIG. 5 is an illustration of a database according to the present invention.

The database 16 stores Quality of Service data representing the assessment of Quality of Service by previous users of the various simulated networks. The gathering and compiling of this data are more specifically detailed below. However, the preferred configuration of the database 16 is illustrated in FIG. 5.

More particularly, database 16 includes network identity information 202. This information preferably corresponds to the network identity information stored in table 100. Also stored in database 16 is quality of service data 204 which includes data values collected on quality of service, end to end speech performance, other data as specified by various standards such as ETSI and ITU-T . . . etc. As shown, for each network, information such as user historical event information, and various language type results and parameters are stored.

Referring back now to FIG. 3, the processing system 20 preferably is a standard multi-media personal computer that is connectable to the network 18. That audio/speech equipment is preferably a sound card and headset 26. Optionally, a network component 28 can be plugged into the voice jacks of the system 20 to assess its effect on a network that is being simulated by the system 10.

In operation, a user/subscriber who endeavors to evaluate Quality of Service for a network, selects (or designs) a simulated network and enters speech data (directly or through use of recording or text to speech technology) into the system that is then processed by an audio/speech tool or music/voice plug-in. The input speech can be displayed on the monitor 22 and listened to on demand.

The input speech signal is then modified by the audio tools according to the parameters of the selected simulated network by adding latency time delay and/or amplitude db reduction (and noise if desired) to ultimately produce an echoed signal which can be displayed and/or played. The modified speech signal is displayed, for repeated review by the user/subscriber. For simulation of voice over a packet network, a script or algorithm may be used to transform the original voice signal, it may be divided into varying length sections, each with a unique path related attribute parameters such as delay and amplitude and the resultant voice signal.

Adjustments can be optionally made to the desired network component(s) script to customize the situation based on network design, compression/decompression algorithms, etc. The evaluator (user/subscriber) listens to the quality comparison of the input source signal and the resultant network signal for a speech and dialect evaluation. This can be used to help determine maximum distances for switching products. Optionally, the network component 28 may be integrated into the selected simulated network for assessment purposes. Component 28 may be a echo canceling unit or a signal compression/decompression unit.

The evaluator inputs an evaluation, for example "good voice quality", via keyboard or optional voice response. This input is then communicated back to the server which stores the result in the database 16 for statistical evaluation and, optionally, generation of an appropriate Quality of Service curve (such as the one depicted in FIG. 2).

More specifically, when a user initiates operation of the system and, necessarily, the method of the present invention, a communication link between the server 12 (through interface 12') and the user's system 20 is established using known techniques. There is first a network setup stage of operation conducted by the server. In this regard, referring now to FIG. 6, information on a configuration of a simulated network selected by the user for evaluation is provided to the user by the server via the interface 12' and the network 18 (step 602). Likewise, information on the components the simulated network and path latency on the simulated network are provided to the user (steps 604, 606). Thus, component, configuration and path latency variations are provided to the user from the storage area 14 by the server through the network 18. This data can be one of many selected designs for an entire network or subsets of an entire network. The data provided to the user may also be modified and/or provided in piecemeal fashion if so dictated by the user in its manipulation of the simulated network to assess various configurations.

Figure 6:
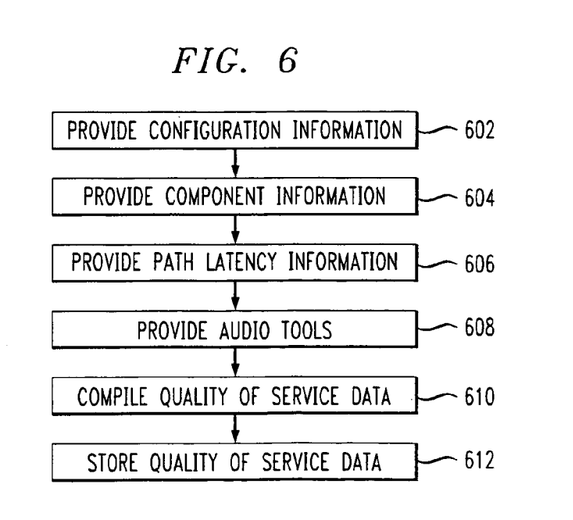
FIG. 6 is a flowchart illustrating an overall preferred method according to the present invention.

Preferably, network design criteria and performance parameters as embodied in the component, configuration and path latency data are ultimately used in conjunction with a script/algorithm and commercially available music or sound analysis tools such as, for example, Sound Forge® from Sonic Foundry Inc., ACID® from Sonic Foundry Inc., Cool Edit® from Syntrillium Software Corporation, Cakewalk® from Twelve Tone Systems, Inc. and Voyetra® from Voyetra Turtle Beach Inc., as will be hereafter described. These or similar tools are provided to the user by the server (step 608) and operate to record voice and play it back on the system 20, as controlled by the user. It is to be appreciated that the audio tools provided to the user facilitate the synthesis of the input speech to simulate a delay, for example. The data on the magnitude of the delay is ascertained by the server from the data relating to the simulated network and then used by the audio tools to simulate the delay to the user The second stage of operation of the system is implemented in response to the evaluator (user/subscriber) who manipulates the provided audio tools to select a language text, input corresponding speech data in some form, listen to the synthesized language text that simulates the selected network operation, and grade it according to published standards as "Very Satisfied", "Good, Satisfied", or "Not Satisfied" under available or designed network variations. The assessments are provided by the user to the server via the network 18. In addition, in the preferred system, the "subscribers" may visually observe their digitized speech input pattern in addition to visually observing how the pattern changes as it passes through each network component. The "subscriber" may also simultaneously listen to these patterns. Thus, the present invention makes it possible for network designers to make adjustments to unique component parameters based on an interaction with other network components and to observe the effects of these adjustments in real time.

Figure 8:
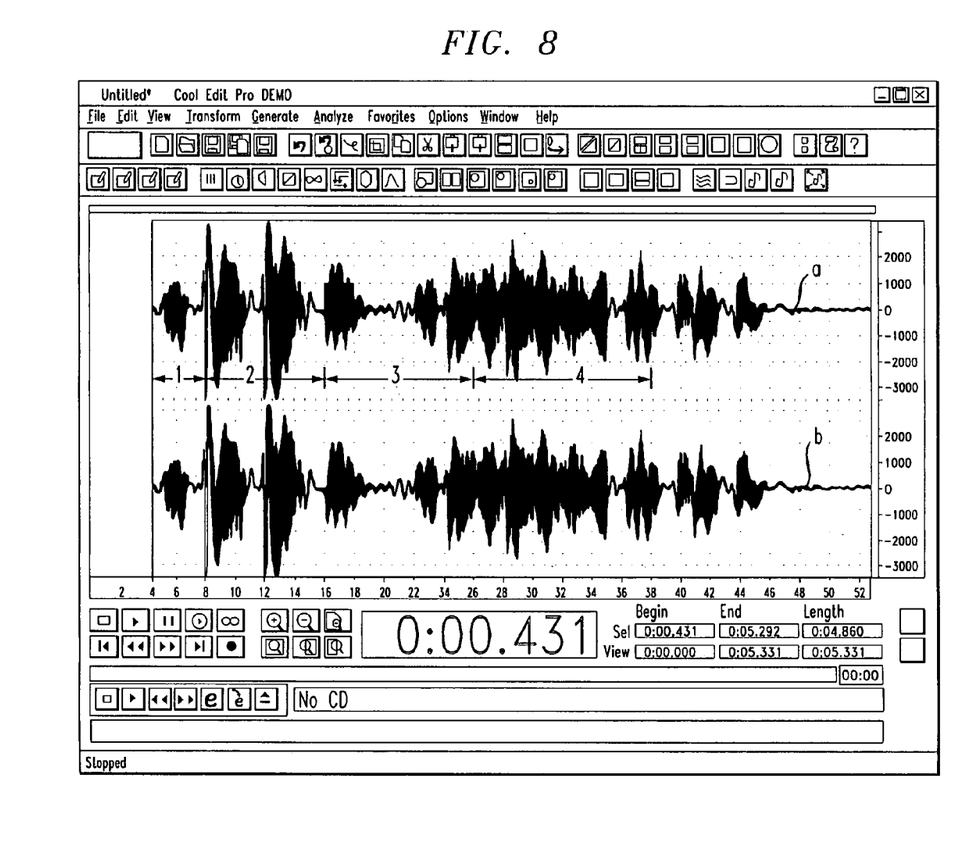

An example of one type of visualization software is shown in FIG. 8. This particular software is Cool Edit® from Syntrillium Software Corporation. FIG. 8 is a graphical representation of an input voice in the upper waveform a with the latency delayed output voice shown in the lower waveform b. Merging these voices together allows the "subscriber" to hear the echo caused by a time delay. Amplitude db loss, for echo suppression, and noise can also be inserted to hear the effects on the original input voice. Furthermore, the input voice can be cut into time segments (as shown by segments 1–4) and delayed to simulate the effects of varying packet segment delivery times over an IP/TCP-ATM network.

The server then compiles the Quality of Service data based on the grades assessed by the user (step 610) and stores the data in the database 16 (step 612). For the given network parameters, the Quality of Service curve can thus be defined, based on many different "subscribers" and cultural differences as specified in ITN standards references on testing Quality of Service in ATM networks. As a result, a database 16 is generated that includes information that is useful for assessing Quality of Service for particular groups of customers (e.g. customers of varying language use) relative to particular network configurations. The configuration of the database 16 may vary but preferably is a relational database for ease of manipulation.

As an alternative to the network-based system described above, it should be appreciated that a storage media with logic and information, such as Compact Disks, could be provided to a PC user to eliminate the need for the www server in appropriate situations. If there was no www Server and simply a PC having suitable tools and data available to it, stand alone operation could be initiated.

Figure 7:
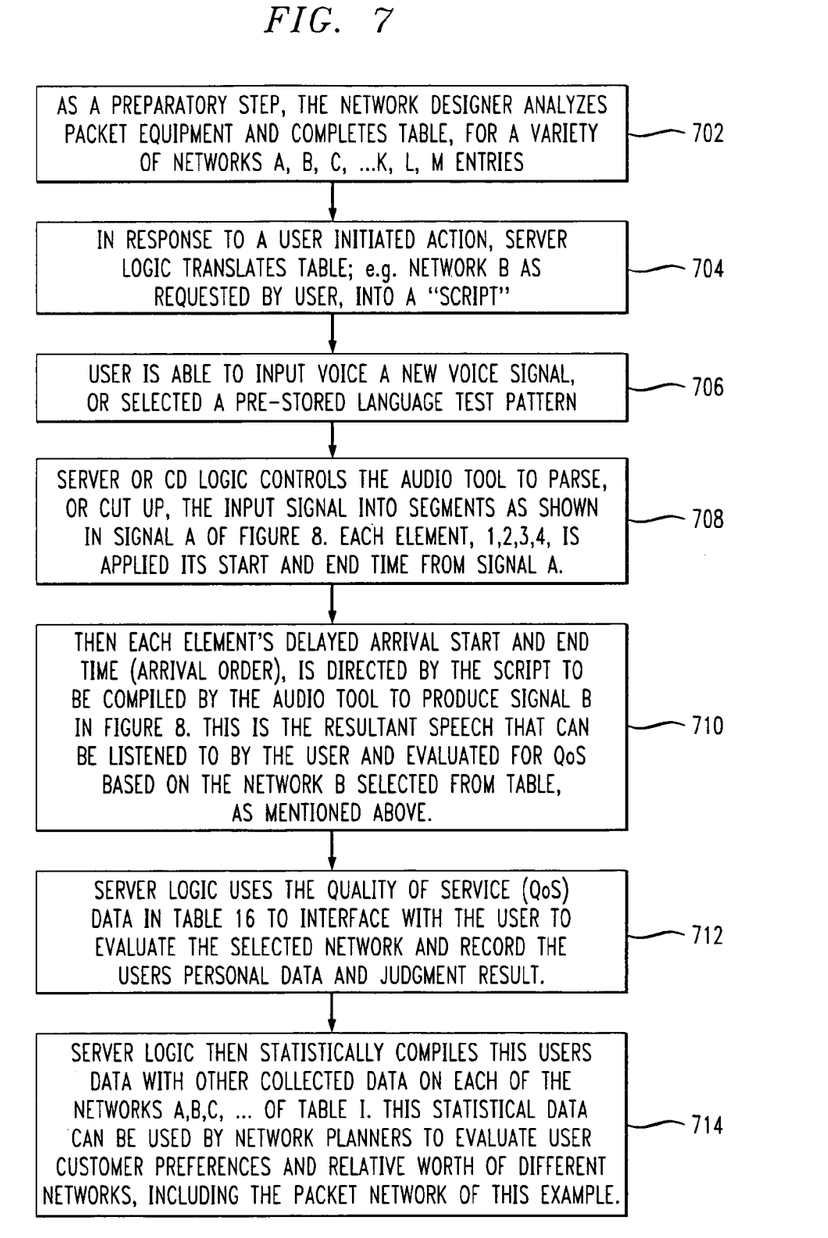

While FIG. 6 shows a general flow of the system primarily from the standpoint of the server 12, FIG. 7 provides a flow diagram in accord with the present invention that includes a practical implementation of the invention, which also takes into account the selections of the designer and user. More particularly, as shown in FIG. 7, as a preparation step, a designer analyzes and gathers information on particular packet and/or network equipment and completes a table such as table 100 for a variety of networks (step 702). In response to a user initiated action, the server through various logic techniques, translates the information in table 100 into a script and provides it to the user, as in steps 602, 604 and 606 (step 704). The user is then afforded the opportunity to input a voice message or use a preselected, prestored language test pattern (step 706). Server or CD logic then controls the audio tools provided in step 608 to parse the input signal as shown in FIG. 8. It should be appreciated that each time segment 1, 2, 3 or 4 is applied at a start and end time in accord with signal a (step 708). Subsequently, each element 1, 2, 3 or 4 is directed by the script to be reconstructed to form the signal b in FIG. 8 (step 710). This is the resultant speech that can be listened to by the user and evaluated for quality of service based on the network selected from the table, as noted above. The server then gathers, compiles and stores the quality of service data in table 16, as in steps 610 and 612 (steps 712 and 714).

It should be appreciated by those skilled in the art that the methods of the present invention are preferably implemented using software and/or hardware techniques known to be effective. Of course, certain of the steps recited involve user/designer selection as a precursor to implementation;

however, other "machine steps" can be initiated through use of, for example, the listed software packages and/or other accepted programming and data gathering processes in accord with the present invention.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

Having thus described the invention, I hereby claim:

1. A method for assessing quality of service for a simulated communication network, the method comprising the steps of:
    providing first information on a configuration of a selected simulated communication network to the user;
    providing second information on components of the simulated communication network to the user;
    providing third information on path latency of the simulated communication network based on the second information to the user;
    providing audio tools to the user to simulate operation of the network based on the first, second and third information; and,
    compiling quality of service data on the simulated communication network that is provided by the user based on the assessment of quality of service of the operation of the simulated communication network using the audio tools.

2. The method as set forth in claim 1 wherein the providing of the first information comprises transferring the first information by a web server from a centralized storage to a processing system accessible by the user.

3. The method as set forth in claim 1 wherein the providing of the second information comprises transferring the second information by a web server from a centralized storage to a processing system accessible by the user.

4. The method as set forth in claim 1 wherein the providing of the third information comprises transferring the third information by a web server from a centralized storage to a processing system accessible by the user.

5. The method as set forth in claim 1 wherein the providing of the audio tools comprises transferring the audio tools by a web server from a centralized storage to a processing system accessible by the user.

6. The method as set forth in claim 1 wherein the compiling is accomplished by a server capable of compiling quality of service data from a plurality of users.

7. An apparatus for assessing quality of service for a simulated communication network, the apparatus comprising the steps of:
    means for providing first information on a configuration of a selected simulated communication network to the user;
    means for providing second information on components of the simulated communication network to the user;
    means for providing third information on path latency of the simulated communication network based on the second information to the user;
    means for providing audio tools to the user to simulate operation of the network based on the first, second and third information; and,
    means for compiling quality of service data on the simulated communication network that is provided by the user based on the assessment of quality of service of the operation of the simulated communication network using the audio tools.

8. The apparatus as set forth in claim 7 wherein the means for providing the first information is a web server which transfers the first information from a central storage to a processing system accessible by the user.

9. The apparatus as set forth in claim 7 wherein the means for providing the second information comprises a web server that transfers the second information from a centralized storage to a processing system accessible by the user.

10. The apparatus as set forth in claim 7 wherein the means for providing the third information comprises a web server for transferring the third information from a centralized storage to a processing system accessible by the user.

11. The apparatus as set forth in claim 7 wherein the means providing the audio tools comprises a web server for transferring the audio tools from a centralized storage to a processing system accessible by the user.

12. The apparatus as set forth in claim 7 wherein the means for compiling is a web server capable of compiling quality of service data from a plurality of users.

13. The apparatus of claim 7 wherein the means for providing the first, second, third information and audio tools comprises:
    a storage having stored therein simulated communication network data and audio tools;
    a server operable to provide the simulated communication network data and audio tools to a user, the server being further operable to compile the quality of service data from the plurality of users and store the compiled data in the database; and,
    an interface operable to facilitate communication between the server and a plurality of users; and
    wherein the means for compiling quality of service data comprises:
    a quality of service database operable to have compiled therein quality of service data from the plurality of users.

14. The system as set forth in claim 13 wherein the server is a web server and the network is the internet.

15. The system as set forth in claim 13 wherein the simulated communication network data comprises data representing at least one of a simulated network configuration, components of the simulated network, and path latency of the simulated network.

16. The system as set forth in claim 13 wherein the audio tools comprise speech analysis components for simulating echo delay in the simulated network.

17. A system for demonstrating the audio characteristics of at least one communication network component under at least one network component configuration, thereby allowing a quality of service associated with the at least one communication network component under the at least one configuration to be assessed, the system comprising:
    a configurable audio tool;
    a database including audio tool configuration information in association with the at least one communication network component and the at least one network component configuration;
    means for selecting the at least one network component from a set of possible network components;
    means for selecting the network component configuration for the selected at least one network component from a set of possible network component configurations;

means for accessing audio tool configuration information from the database based on a selection of at least one network component and at least one network component configuration;

means for configuring the audio tool according to the accessed audio tool configuration information; and means for playing a message through the configured audio tool, thereby allowing a user to hear and assess a demonstrated quality of service associated with the selected at least one network component under the selected network component configuration.

18. The system of claim 17 wherein the means for selecting at least one network component and the means for selecting the network component configuration comprise:

an interface operable to facilitate a selection of at least one network component and component configuration;

wherein the means for configuring the audio tool according th the access audio tool configuration information comprises:

a translator operable to translate the selected at least one network component and component configuration selection into a script for processing audio data through the audio tool based on the communication network component data stored in the storage; and wherein the means for playing a message through the configured audio tool comprises:

an audio transducer driven by the audio tool, whereby a user can assess audio characteristics of audio data processed according to the script.

* * * * *